United States Patent [19]

Hovis et al.

[11] Patent Number: 5,387,050
[45] Date of Patent: Feb. 7, 1995

[54] EXTRUDED ETHYLENIC POLYMER FOAM CONTAINING BOTH OPEN AND CLOSED CELLS

[75] Inventors: Edward E. Hovis, Newark; Eric D. Johnson, Wilmington; Michael J. Schroeder, Newark, all of Del.

[73] Assignee: Nomaco Inc., Zebulon, N.C.

[21] Appl. No.: 821,671

[22] Filed: Jan. 16, 1992

Related U.S. Application Data

[60] Division of Ser. No. 760,149, Sep. 16, 1991, Pat. No. 5,098,782, which is a division of Ser. No. 526,629, May 22, 1990, Pat. No. 5,059,631, which is a division of Ser. No. 365,838, Jun. 14, 1989, Pat. No. 4,931,484, which is a continuation-in-part of Ser. No. 257,510, Oct. 13, 1988, abandoned.

[51] Int. Cl.$^6$ ............................................. E01C 11/02
[52] U.S. Cl. ......................................... 404/74; 404/66
[58] Field of Search ................. 404/64, 66, 67, 68, 404/69, 74, 47, 49; 14/16.5; 52/403

[56] References Cited

U.S. PATENT DOCUMENTS 5,007,765  4/1991  Dietlein et al. ...................... 404/64

FOREIGN PATENT DOCUMENTS 59-194820  11/1984  Japan .

*Primary Examiner*—Morton Foelak
*Attorney, Agent, or Firm*—Caesar, Rivise, Bernstein, Cohen & Pokotilow, Ltd.

[57] ABSTRACT

Disclosed is an extruded, low density, non-outgassing ethylenic polymer foam containing 30–85% open cells and the remainder closed cells and having an essentially integral surface. The foam possesses superior compression recovery and lower compression resistance when compared with similarly comprised ethylenic closed cell foams and superior moisture resistance and handling characteristics when compared to open cell foams.

6 Claims, No Drawings

EXTRUDED ETHYLENIC POLYMER FOAM CONTAINING BOTH OPEN AND CLOSED CELLS

CROSS-REFERENCE TO RELATED APPLICATIONS

This application is a division of Serial No. 760,149, filed on Sep. 16, 1991, now U.S. Pat. No. 5,098,782 which is a division of application Ser. No. 07/526,629, filed May 22, 1990, now U.S. Pat. No. 5,059,631 which is a division of application Ser. No. 365,838, filed Jun. 14, 1989 now U.S. Pat. No. 4,931,484, which is a continuation in part of application Ser. No. 257,510, filed Oct. 13, 1988, now abandoned.

BACKGROUND OF INVENTION

1. Field of the Invention

This invention relates to the chemical arts. In particular, it relates to flexible polymeric foams.

2. Description of the Prior Art

Flexible polymeric foams have been known and produced commercially for many years. Until now, essentially all commercial foams have been either closed cell or open cell. Closed cell flexible foams have tended to be formed from polyolefins, while open cell flexible foams have most commonly been formed from polyurethanes.

Currently a sizeable market exists for both open cell and closed cell foam, particularly foam rods, as a backer material for sealants in joints in the highway, airport and building construction industries.

Foam rods are particularly useful in the repair of existing pavement. In new construction, the joint to be sealed is generally well formed with uniform sidewalls. In contrast, when repairing or reconditioning existing pavement, the joint can be very non-uniform, with numerous imperfections, called "spalls and ravels", which remain even if it has been resawed and cleaned. The purpose of the backer rod is to limit the penetration of the sealant into the bottom of the joint, so that the cured sealant will have optimum adhesion to the sidewall during subsequent expansion-contraction cycles. Adhesion of the sealant to the bottom of the joint is undesirable, since it places additional stress on the sidewall seal during expansion-contraction cycles leading to premature failure of the joint sealant integrity.

Both open and closed cell foam rods possess distinct disadvantages. The disadvantages of closed cell rods include their high compression resistance, low compression recovery and tendency to "outgas" if their cells are ruptured during installation. Their high compression resistance and low compression recovery mandates a close match between rod size and joint size. This means that manufacturers must make and inventory a large number of sizes. Further, "outgassing" can cause bubbles to occur in the sealant, thereby reducing the sealant's effectiveness.

Open cell rods with their low compression resistance and high compression recovery can be supplied in fewer sizes and do not outgas, since there are no gas containing cells to rupture. However, open cell rods are hydrophilic and can wick moisture into the joint, thus causing water sensitive sealants to fail prematurely. The rough cellular surface of the rod can absorb sealant. Also, the nature of manufacture of open cell rods gives rise to several disadvantages. It can give rise to a dust problem. Further, open cell rods typically are not uniform and at regular intervals there are joints in the rods which exhibit different properties than the regular rod. Also due to the materials of construction and methods of manufacture, open cell rods are inherently more expensive than closed cell rods.

The flexible, low density, ethylenic polymer foams of the invention overcome the problems surrounding conventional open or closed cell foams. The foams of the invention are extruded into simple shapes, exhibiting the low compression resistance, high compression recovery, and non-outgassing nature characteristic of open cell urethane foams, while possessing the integral or non-absorbing skin of closed cell foams.

Because rods formed from ethylenic polymers of the invention possess both low compression resistance and superior compression recovery, they are superior to existing backer rods when used in the repair or reconditioning of existing buildings or pavement. This is because they can easily conform to the rough, non-uniform joint sidewalls and stop leakage of the sealant material into the bottom of the joint.

The use of polymer blends and more particularly of low modulus ethylene copolymers to prepare low density polymeric foams is known in the art. It is disclosed in U.S. Pat. Nos. 4,101,467, 4,129,530 and 4,215,202. However, the foams are closed cell in nature.

U.S. Pat. No. 3,939,237 discloses using decomposition blowing agents to prepare partially open cell polyolefin foams. However, the foams obtained are quite high in density and are very thin, less than 3 mm.

U.S. Pat. No. 4,384,032 discloses relatively high density open cell polyolefin foams, which incorporate polystrene or other incompatible polymers. Again, decomposition blowing agents are used either alone or in conjunction with a volatile blowing agent. The polystyrene, or other incompatible polymer, is crucial in providing the open cell nature of the product.

U.S. Pat. No. 3,379,802 discloses a process for producing open cell-closed cell low density foams by incorporating an elastomer into a molten olefinic polymer. The patent teaches that olefinic copolymers such as ethylene and ethyl acrylate and ethylene and vinyl acetate, which may have a low enough modulus to produce a soft foam in the unmodified state, cannot be extruded alone to produce a satisfactory foam, since the foams are dimensionally unstable and collapse upon extrusion.

U.S. Pat. No. 4,499,210 discloses a process for manufacturing a cross-linked polyethylene foam using a trifunctional monomer and silicone oil to produce an open cell structure. This composition is foamed subsequent to compounding, in a separate heat treatment.

Surprisingly, the ethylenic polymer foam of the invention is quite stable. Completely closed cell foams are notoriously unstable. Many patents, such as U.S. Pat. No. 4,359,539, and those cited therein, disclose the use of various compounds as blocking agents to dimensionally stabilize polyolefin foams. In contrast, the new foams, containing both open and closed cells, are stable, even when no blocking agents are included in the invention.

SUMMARY OF THE INVENTION

The invention relates to an extruded, low density, ethylene polymer foam containing from 30% to 85% open cells and the remainder closed cells and having an integral surface. The foam has a cross-section of from about 0.2 in$^2$ to about 40 in$^2$, a density of from about 1.5 lb/ft$^3$ to about 10 lb/ft$^3$ and a compression resistance of 8.5 psi or less at 50% compression. The foam possesses superior softness and flexibility when compared with conventional olefinic foams.

DETAILED DESCRIPTION OF THE PREFERRED EMBODIMENTS

The extruded, low density foam of this invention is prepared by foaming polyethylene, soft ethylenic copolymers or blends thereof. In preferred embodiment, the polyethylene is a low density polyethylene (LDPE), most preferably LDPE of from 1 to 8 MI. A soft copolymer is one which possesses a secant modulus of less than 15,000 psi, when measured by ASTM Method D-882. Representative soft ethylenic copolymers include ethylene vinyl acetate (EVA), ethylene methyl acrylate (EMA), ethylene ethyl acrylate (EEA) and ethylene acrylic acid (EAA). EVA is preferred. Where high temperature resistance is required, a silane modified cross-linkable ethylene copolymer, such as a silane modified cross-linkable ethylene ethyl acrylate copolymer, and a catalyst for the cross-linkable copolymer are used. The blends preferably contain from about 15% to about 90%, more preferably 25% to about 75% and most preferably about 50% of at least one soft ethylenic copolymer.

The use of blends of polyethylene and a soft copolymer facilitates processing. Moreover, foams prepared from a blend of polymers have a softer feel than foams made from 100% LDPE.

The ethylenic foams are made on commercially available foam extrusion equipment, customarily used for closed cell foam extrusion, such as the tandem extruder system supplied by Gloucester Engineering Company, Gloucester, Mass. In preferred embodiments, such extruders contain an air cooling ring to cool the surface of the foam immediately upon its emergence from the die.

The foams are directly extruded on standard tandem foam extrusion lines. Process conditions are similar to standard closed cell process conditions, however, it has been found that the polymer melt must be cooled less than normal, except at the forming dies which are run at normal or lower temperatures. It has been found that maintaining the proper temperatures is important in obtaining an essentially integral surface skin.

The exact processing conditions will depend upon the size and configuration of the extruded product. The particular conditions for a particular product will be readily apparent to one skilled in the art, without undue experimentation, upon reading the specification. In every instance, however, there is at least a 10° F. increase in melt temperature over normal closed cell conditions for the same polymer compositions.

The volatile blowing agents used are those typically used in the industry, such as CFC 12 or 114 or HCFC 22, currently sold by DuPont as Formacel S, volatile hydrocarbons, or blends thereof. The nucleating agents used are also those typically used in the industry, such as talc or calcium silicate. In some embodiments, the foam also contains a surface active agent to reduce static charges. The foam can also contain other conventional additives, such as pigments and dyes, processing aids, flame retardants or blocking agents.

The resulting foam has a density of from about 1.5 to about 10 lb./ft$^3$, preferably about 1.5 to about 3.5 lb./ft$^3$. The density is preferably at least 1.9 lbs/ft$^3$ and more preferably at least 2 lbs/ft$^3$. The most preferred practice is 2.3 to 3.5 and preferably about 2.5 lbs/ft$^3$. The directly extruded foams have a cross section of from about 0.2 in$^2$ up to about 40 in$^2$.

In the broadest aspect of this invention, the foam rod may contain 5–80% open cells. Since, however, there should be a significant amount of open cells, a preferred broad range would be 30–85% open cells, preferably 40–80%. Actual foam rods made in accordance with the invention (the rods of example 1) have contained 63.5% open cells. The following chart lists % open cell of other actual foam rods.

| ROD DIAMETER (inches) | % OPEN CELL |
|---|---|
| 3/8 | 76.7 |
| 5/8 | 60.5 |
| 3/4 | 80.7 |
| 7/8 | 76.4 |
| 2 | 67.6 |

Based upon values from actual foam rods, the most preferred range would be about 60–80% open cell.

The foam rod in its broadest aspect should have a compression resistance of 10 psi or less at 50% compression. It has been found, however, that when the compression resistance goes over about 8.5 psi, the foam becomes dimensionally unstable. Preferred ranges are 2–7 psi, 3–6 psi and 3–5 psi.

An outstanding property of the foam rod is its non-outgassing nature. The skinned open-cell foam rod of this invention eliminates the outgassing problems associated with punctured, closed cell conventional backer rods which can cause bubbles in the sealant. Although the mechanism is not fully understood, we believe the open cells in the interior of the foam rod of the invention permit gases to flow within the rod rather than outgas into the sealant. The rod of the present invention shows no outgassing when tested by ASTM C24.32.13 (Task Group 13) PROPOSED TEST METHOD FOR DETERMINING OUTGASSING FROM JOINT FILLER MATERIALS USED AS BACK-UP FOR SEALANTS IN BUILDING JOINTS.

In preferred embodiments, the foams are extruded into the form of rods having an essentially circular cross section. Such rods are particularly useful as backer material for sealants in expansion and contraction joints in the highway, airport and building construction industries. Shapes, other than those with an essentially circular cross-section, can also be made. For example, shapes having triangular, rectangular, annular or elliptical cross-sections are possible.

The foamed rods are particularly useful in making sealed building or paving construction joints. A typical joint is formed from a joint having a bottom and two sidewalls. A foamed rod is inserted into the joint. The cross-sectional area of the foamed rod is chosen so that it is compressed from about 25% to about 60% of its relaxed transverse cross-sectional dimension, by the sidewalls of the joint. A fluid impervious sealant is then overlaid on top of the backer rod. The fluid impervious sealant is typically a silicone or asphalt based viscous liquid or paste-like material which is capable of filling any sidewall irregularities. Such sealants cure over time to form a flexible solid. The foam rod optimizes the depth of the sealant and prevents any sealant from penetrating through to the bottom of the joint. This results in optimum adhesion of the sealant to the sidewalls.

The following examples are included to further illustrate the invention. They are not limitations thereon.

Example 1

LDPE, 2 MI, (Union Carbide DNDA 4140), and EVA resin, (DuPont Elvax® 3170) were fed into a tandem foam extruder system, in the ratio of 30 parts LDPE, 70 parts EVA, along with 0.4% calcium silicate, (Micro-cel C® from Manville), as a nucleating agent, 0.6% glycerol monosterate (Atmos 150®) as a blocking agent and 0.2% zinc stearate as a processing aid. The extruder barrel temperature of the #2 extruder was controlled at 174–180° F. The die orifice was controlled at 205° F.

The following table compares the properties of a standard closed cell LDPE rod (HBR® Backer Rod, manufactured by AET, Inc.), an open cell polyurethane rod (Ohio Foam manufactured by AET, Inc.) and the rod prepared in Example 1.

|  | Closed Cell | Open Cell | Open Cell/Closed Cell |
|---|---|---|---|
| Polymer Composition | LDPE | Polyether Urethane | 30% LDPE 70% EVA |
| Diameter | 0.65 | 0.63 | 0.62 |
| 25% Compression Resistance[1] psi | 8.4 | 6.6 | 3.5 |
| 50% Compression Resistance[1] psi | 19.0 | 8.4 | 6.6 |
| Water Absorption[2] Volume % | <0.5 | >35 | <0.5 |
| Visual Appearance | Cylindrical rod, smooth, shiny surface, very small uniform cell structure. | Cylindrical rod, rough fuzzy surface, very small uniform cell structure. | Cylindrical rod, smooth, dull, slightly wrinkled surface, small cells with a few large cells which tend to lie in the center of the rod. |

[1]Measured as specified in pending ASTM "Specification for Backer Material for Use With Cold and Hot Applied Joint Sealants Used with Portland Cement Concrete and Asphalt Pavement Joints."
[2]Measured as specified in ASTM method 509.

The open cell-closed cell foam after 7 days at 50% compression recovers 95% of its diameter in 24 hours, similar to the open cell foam.

Example 2

A 50/50 blend of LDPE (Union Carbide DNDA 4140) and EVA (DuPont Elvax® 3170) was extruded through a Gloucester Tandem Extruder System. The feed rate was approximately 180 lbs/hour. CFC 12 was injected into extruder #1 as the blowing agent. 0.4% calcium silicate (Micro-cel C® from Manville) was added as a nucleating agent. 0.5% glycerol monosterate (Atmos 150®) was used as a blocking agent. Zinc stearate and carbon black were added as a processing aid and colorant, respectively, at 0.1%. The barrel temperature of the #2 extruder was controlled at 187° F. A two inch diameter foam rod having an open cell-closed cell structure and a density of about 2.1 lb/ft$^3$ was produced. Compression resistance at 50% compression was 2.9 psi, while 24 hour recovery after 24 hours of compression was 99%. The rod was light gray, dull and smooth skinned. The cell structure was generally small, but with a few large cells which tended to be located toward the center of the rod.

Example 3 (Comparison Example)

The procedure of Example 2 was repeated using the same ingredients, except 100% LDPE (Union Carbide DNDA 4140) was employed. The barrel temperature of the #2 extruder was controlled at 175° F. The product was a 2" diameter, approximately 2.2 lb/ft density, 100% closed cell rod. The product had a compression resistance of 15.9 psi at 50% compression, and a 24 hour recovery after 24 hours compression of only 80%. The rod had a light gray, smooth, shiny surface and a very small uniform cell size.

Example 4

The procedure of Example 3 was repeated except that talc (Mistron ZCS from Cyprus Corp.) was used at the 0.65% level as the nucleator and stearamide (Kemamide® S from Humko) was used at 0.65% as the blocking agent. The barrel temperature of the #2 extruder was controlled at 200° F. The product was a 2" diameter rod with open cell-closed cell nature. It had a compression resistance of 4.3 psi at 50% compression and a 24 hour recovery after 24 hours compression of 92%. The cell size was small with occasional large cells. A comparison of the products prepared in Examples 3 and 4 shows the importance of the barrel temperature of the #2 extruder in the formation of an open-closed cell structure.

Example 5

A 50/44.5/5.5 blend of LDPE (Union Carbide DNDA 4140), a silane modified cross-linkable EEA (Union Carbide DFDA 1592) and a catalyst for the cross-linkable copolymer (Union Carbide DEFD 1590) were extruded as in Example 4, except that 0.6% nucleating and blocking agent was added. The barrel temperature of #2 extruder was controlled at 190° F. A 2" diameter rod of 2.4 lb/ft density was produced. The rod possessed both open cell and closed cells. Its compression resistance was 2.9 psi at 50% compression and its recovery after 24 hours was 96%. The rod had a smooth, integral skin, and a medium cell size.

Example 6

A polymer blend was extruded as in Example 2, except that HCFC 22 was used as the blowing agent. A rod of about 2.8 lb/ft density possessing both open and closed cells was produced. The cell size was small, but not as uniform as in Example 2. It was, however, still acceptable.

What is claimed is:

1. A polymer foam sealant backer rod adapted to be compressed between and provide a seal between two surfaces, said sealant backer rod being cellular, with the greatest percentage of the cells being open, and an integral skin covering the foam for preventing sealant from passing through the backer rod.

2. The foam sealant backer rod of claim 1 wherein the open cells are present in a percent sufficient to render the backer rod non-outgassing as determined by ASTM C24.32.13 (Task Group 13) Proposed Test Method for Determining Outgassing.

3. The foam sealant backer rod of claim 1, wherein the open cell content is at least 60%.

4. The polymer foam sealant backer rod of claim 1, having a density of 1.5 lbs/ft.$^3$ to about 10 lbs/ft$^3$ and a compression resistance of 10 psi or less at 50% compression.

5. A backer rod for use in sealing joints comprising an open cell foam having an impervious skin.

6. The backer rod of claim 5 in which the rod has a density of 1.5 lbs/ft.$^3$ to about 10 lbs/ft.$^3$ and a compression resistance of 3.5 psi at 25% compression resistance.

* * * * *